Patented Feb. 10, 1931

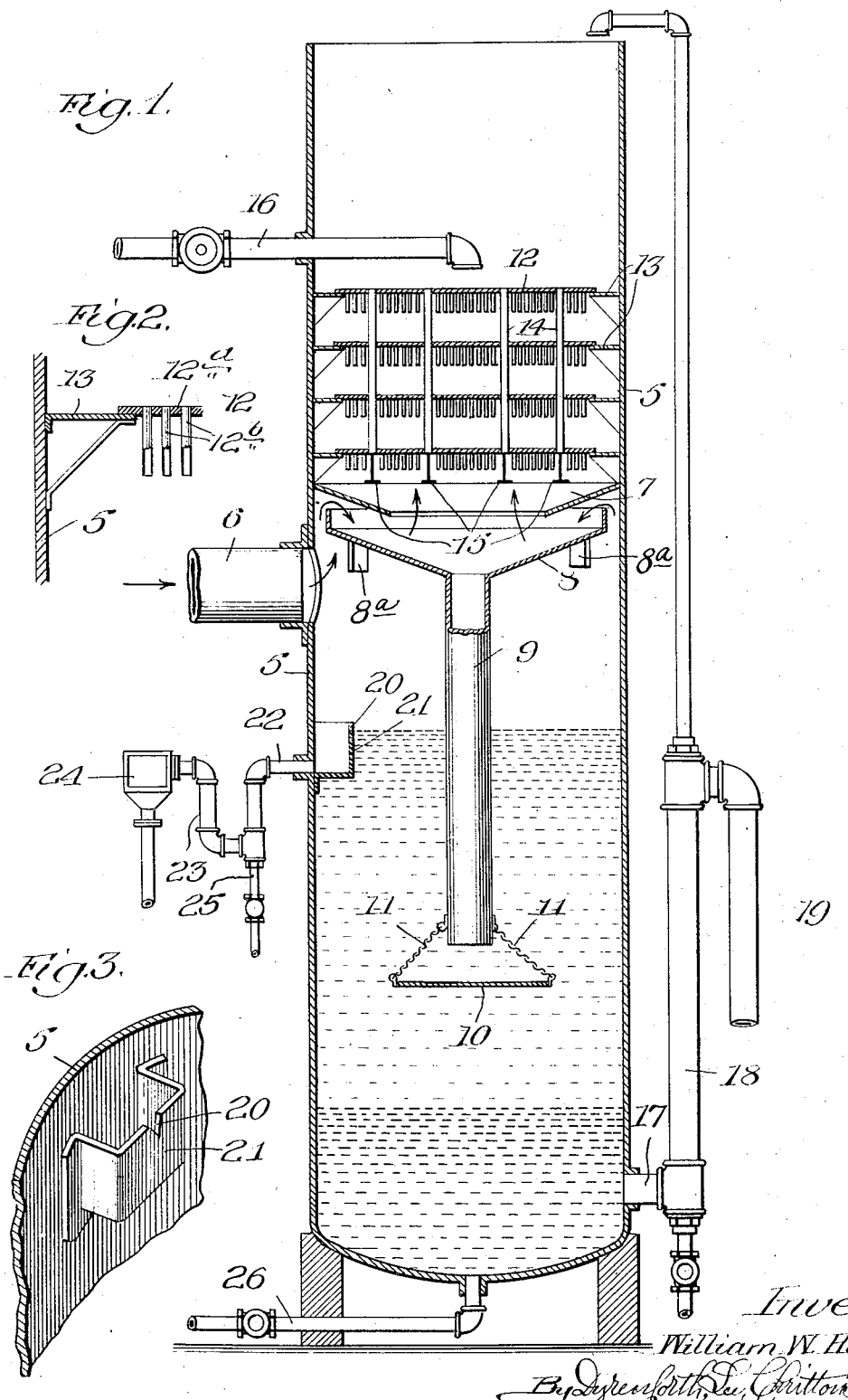

1,792,164

UNITED STATES PATENT OFFICE

WILLIAM W. HOLLAND, OF ALTON, ILLINOIS, ASSIGNOR TO STANDARD OIL COMPANY, OF WHITING, INDIANA, A CORPORATION OF INDIANA

CONDENSING AND SEPARATING DEVICE

Application filed January 2, 1929. Serial No. 329,851.

The present invention relates to improvements and devices for condensing vapors such as steam and simultaneously separating therefrom any oil carried by such vapors, and is primarily intended for use in connection with steam distillation operations on heavy mineral oils. It will be fully understood from the following description, illustrated by the accompanying drawing, in which:

Figure 1 is a vertical sectional view through a device embodying the invention;

Fig. 2 is a broken sectional detail view of the plates for countercurrent contact between escaping steam and condensing water; and Fig. 3 is a broken detail view in perspective, showing the overflow dam and weir for removal of separated oil.

The device illustrated is primarily intended for use in connection with pipe still distillation or reduction of lubricant mineral oils with steam. After passing through suitable condensers (not shown) for separating out the greater portion of the oil products from the steam, the uncondensed steam enters the shell 5 of the device through the pipe 6. Above the opening of the pipe 6, there is provided the annular baffle 7 having a downward pitch, this baffle thus having the form of an inverted truncated cone. Below the opening of this baffle there is mounted a funnel-like member 8, the rim of which is spaced from the wall of the shell being secured thereto by means of a plurality of brackets $8^a$. This funnel-member discharges into the depending pipe 9 which opens into the lower part of the shell below the liquid level therein. A baffle plate 10 is supported, suitably by chains 11, below the opening of the depending pipe 9 to prevent substantial agitation of the liquid contents of the lower part of the shell by descending liquid.

Above the baffle 7, the spaced horizontal liquid contact plates 12 are mounted in the shell 5, suitably resting upon the annular flanges 13 secured to the inner wall of the shell. The rods 14, resting on the T-bars 15 which extend transversely of the shell, aid in supporting the plates 12 and spacing them from each other.

The plates 12 are preferably constructed as shown in Figs. 1 and 2, being formed of a perforated plate member $12^a$, from the openings of which depend the tubes $12^b$. It is readily apparent that other forms of effective countercurrent baffle plates, such as bubble plates, screen plates or hairpin plates may be employed in lieu of the tube plates 12 illustrated in the drawings.

In the operation of the device, the steam entering through the pipe 6 is caused to pass around and over the rim of the funnel-member 8 and through the center opening in the baffle 7 into the upper part of the shell, then passing through the contact plates 12 in countercurrent to a descending stream of water, supplied through the valve-controlled pipe 16. The steam is effectively condensed and the resulting condensed water, with any accompanying oil, together with the condenser water supplied through the pipe 16, descends through the device, being guided by the baffle 7 into the funnel 8 and depending pipe 9, and discharging in the lower portion of the shell below the liquid level therein.

The liquid in the shell is maintained in substantially quiescent state, the baffle 10 preventing excessive disturbance thereof. Oil carried by the entering steam may be either entrained or in vapor form. The entrained oil particles are in part separated by the reduction in velocity of the steam taking place on entering the shell 5 and in part by the baffle action of the funnel 8, the baffle 7 and the plates 12. Any vaporized oil is condensed with the steam. Thus the oil finds its way into the lower portion of the shell with the water, and separates therein, rising to the surface of the water. The separated water is discharged through the pipe 17, riser 18 and overflow pipe 19, the position of which determines the water level in the lower portion of the shell. By varying the height of the connection between the overflow pipe 19 and the riser 18, the level of the water in the shell may be controlled as desired.

The oil on the surface of the water discharges through a weir 20 in a dam 21 which protects the opening of the pipe 22 for the discharge of the oil. The oil discharge pipe 22 communicates with the trap 23 and the look-box 24, the trap being provided with drain pipe 25.

A suitable valve controlled drainage pipe 26 communicates with the bottom of the shell for draining or cleaning the latter.

Although the invention has been described in connection with a specific embodiment thereof, it is to be understood that the details thereof are not to be regarded as limitations upon the scope of the invention, except as set forth in the accompanying claims.

I claim:

1. In condensing and separating devices, a shell having a vapor pipe opening thereinto, means for retaining a body of liquid in the shell below said opening and for separately withdrawing heavier and lighter retained liquids therefrom, a baffle above said opening, said baffle permitting upward flow of vapors while directing any downflowing liquid toward the middle of the shell, liquid contact devices in said shell above said baffle, means for discharging liquid into said shell above said baffle to flow in countercurrent to the flow of vapors through said contact devices, and means positioned below said baffle to collect such liquid together with condensate from said contact devices, and conduct it to the lower portion of the shell below the level of the body of liquid therein.

2. In condensing and separating devices, a shell having a vapor pipe opening thereinto, means for retaining a body of liquid in the shell below said opening and for separately withdrawing heavier and lighter retained liquids therefrom, a baffle above said opening, said baffle permitting upward flow of vapor while directing any downflowing liquid toward the middle of the shell, liquid contact devices in said shell above said baffle, means for discharging liquid into said shell above said baffle to flow in countercurrent to the flow of vapors to said contact devices, means spaced below said baffle and extending to a point above said opening to collect such liquid together with condensate from said contact devices and conduct it to the lower portion of the shell below the level of the body of liquid therein, and means for preventing agitation of the body of the liquid thereby.

3. In condensing and separating devices, a shell having a vapor pipe opening thereinto, means for retaining a body of liquid in the shell below said opening and for separately withdrawing heavier and lighter retained liquids therefrom, a baffle above said opening, said baffle permitting upward flow of vapors, liquid contact devices in said shell above said baffle, means for discharging liquid into said shell above said baffle to flow in countercurrent to the flow of vapors through said contact devices, a funnel below said baffle and adapted to receive the liquid and condensate from the contact devices, said funnel member having a depending pipe extending below the level of the body of liquid retained in the shell to guide the collected liquid thereinto, the upper portion of said funnel being positioned above said opening and spaced below said baffle, whereby the upwardly flowing vapors are deflected into the upper portion of said funnel.

4. In condensing and separating devices, a shell having a vapor pipe opening thereinto, means for retaining a body of liquid in the shell below said opening and for separately withdrawing heavier and lighter retained liquids therefrom, a baffle above said opening, said baffle permitting upward flow of vapors, liquid contact devices in said shell above said baffle, means for discharging liquid into said shell above said baffle to flow in countercurrent to the flow of vapors through said contact devices, a funnel below said baffle and adapted to receive the liquid and condensate from the contact devices, said funnel member having a depending pipe extending below the level of the body of liquid retained in the shell to guide the collected liquid thereinto, and a baffle in the body of liquid and spaced from the opening of said depending pipe to prevent undue agitation of the body of liquid.

5. In condensing and separating devices, a shell having a vapor pipe opening thereinto, means for retaining a body of liquid in the shell below said opening and for separately withdrawing heavier and lighter retained liquids therefrom, a baffle above said opening, said baffle having a central opening to permit upward flow of vapors, condensing means above said baffle, a funnel member below the opening in said baffle adapted to receive the descending condensate formed above the baffle, said funnel member having a depending pipe extending below the level of the body of liquid retained in the shell to conduct said condensate thereinto, the upper portion of said funnel being positioned above said opening and spaced below said baffle, whereby the upwardly flowing vapors are deflected into the upper portion of said funnel.

6. In condensing and separating devices, a shell having a vapor pipe opening thereinto, means for retaining a body of liquid in the shell below said opening and for separately withdrawing heavier and lighter retained liquids therefrom, a baffle above said opening, said baffle having a central opening to permit upward flow of vapors, condensing means above said baffle, a funnel member below the opening in said baffle adapted to receive the descending condensate formed above the baffle, said funnel member having a depending pipe extending below the level of the body of liquid retained in the shell to conduct said condensate thereinto, and a baffle member spaced from the opening of said depending pipe and within the body of liquid to prevent excessive agitation thereof.

WILLIAM W. HOLLAND.